(12) United States Patent
Braunisch et al.

(10) Patent No.: US 12,088,360 B2
(45) Date of Patent: Sep. 10, 2024

(54) DISPERSIVE WAVEGUIDE CROSSTALK MITIGATION

(71) Applicant: Intel Corporation, Santa Clara, CA (US)

(72) Inventors: Henning Braunisch, Phoenix, AZ (US); Georgios Dogiamis, Chandler, AZ (US); Diego Correas-Serrano, Tempe, AZ (US); Neelam Prabhu Gaunkar, Chandler, AZ (US); Telesphor Kamgaing, Chandler, AZ (US); Cooper S. Levy, Portland, OR (US); Chintan S. Thakkar, Portland, OR (US); Stefano Pellerano, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 946 days.

(21) Appl. No.: 16/897,135

(22) Filed: Jun. 9, 2020

(65) Prior Publication Data
US 2020/0304171 A1 Sep. 24, 2020

(51) Int. Cl.
*H04B 3/32* (2006.01)
*H04L 25/03* (2006.01)

(52) U.S. Cl.
CPC ......... *H04B 3/32* (2013.01); *H04L 25/03885* (2013.01)

(58) Field of Classification Search
CPC ... H04L 25/03885; H04L 27/06; H04L 27/01; H04L 27/36; H04L 27/38; H04B 3/32; H04B 1/0475; H04B 1/10; H04B 3/04; H04B 1/06; H04B 1/02
See application file for complete search history.

(56) References Cited

U.S. PATENT DOCUMENTS

| | | | | |
|---|---|---|---|---|
| 6,175,591 | B1* | 1/2001 | Iwamatsu | H03H 17/06 375/232 |
| 6,999,499 | B1* | 2/2006 | Park | H04L 27/22 375/144 |
| 7,113,539 | B1* | 9/2006 | Strolle | H04L 7/0087 375/229 |
| 7,804,915 | B2* | 9/2010 | Huang | H04L 27/364 375/295 |
| 2007/0217490 | A1* | 9/2007 | Blake | H04L 27/2626 375/222 |
| 2013/0157589 | A1* | 6/2013 | Shirakata | H04L 27/367 455/75 |

(Continued)

OTHER PUBLICATIONS

Campion et al. "Toward Industrial Exploitation of THz Frequencies: Integration of SiGe MMICs in Silicon-Micromachined Waveguide Systems", Nov. 2019, IEEE Transactions on Terahertz Science and Technology, vol. 9, No. 6, pp. 624-636. (Year: 2019).*

(Continued)

*Primary Examiner* — Sophia Vlahos
(74) *Attorney, Agent, or Firm* — Akona IP PC

(57) ABSTRACT

Embodiments may relate to a baseband module with communication pathways for a first data signal and a second data signal. The baseband module may also include a finite impulse response (FIR) filter in a communication path between the first signal input and the second signal output. Other embodiments may be described or claimed.

21 Claims, 6 Drawing Sheets

(56) References Cited

U.S. PATENT DOCUMENTS

| | | | |
|---|---|---|---|
| 2014/0037032 A1* | 2/2014 | Yan | H04L 25/03821 |
| | | | 375/346 |
| 2014/0209806 A1* | 7/2014 | Nishino | G01T 1/17 |
| | | | 250/363.01 |
| 2014/0307768 A1* | 10/2014 | Gotman | H04B 7/0413 |
| | | | 375/232 |
| 2015/0045666 A1* | 2/2015 | Lin | A61B 8/5223 |
| | | | 600/441 |
| 2018/0123857 A1* | 5/2018 | Limberg | H04L 27/2617 |
| 2019/0115951 A1 | 4/2019 | Braunisch et al. | |
| 2019/0383873 A1* | 12/2019 | Hojabri | G01R 31/31905 |

OTHER PUBLICATIONS

Dolatsha, Nemat, et al., "Loss and Dispersion Limitations in mm-Wave Dielectric Waveguides for High-Speed Links," IEEE Transactions on Terahertz Science and Technology, vol. 6, No. 4, Jul. 2016; 4 pages.

Lee, J. Y., et al., "Future of high-speed short-reach interconnects using clad-dielectric waveguide," Proceedings of SPIE 10109, Optical Interconnects XVII, 1010903 (Feb. 20, 2017); 11 pages.

Song, Ha Il, et al., "Plastic straw: future of high-speed signaling," Scientific Reports, www.nature/scienticreports, published Nov. 3, 2015; with Supplementary Information; 28 pages.

\* cited by examiner

DISPERSIVE WAVEGUIDE CROSSTALK MITIGATION

BACKGROUND

Millimeter-wave (mmWave) and terahertz-frequency (THz) waveguide interconnects may be possible alternatives to electrical and optical interconnects in datacenter and high-performance computing applications.

DETAILED DESCRIPTION

Figure 1:
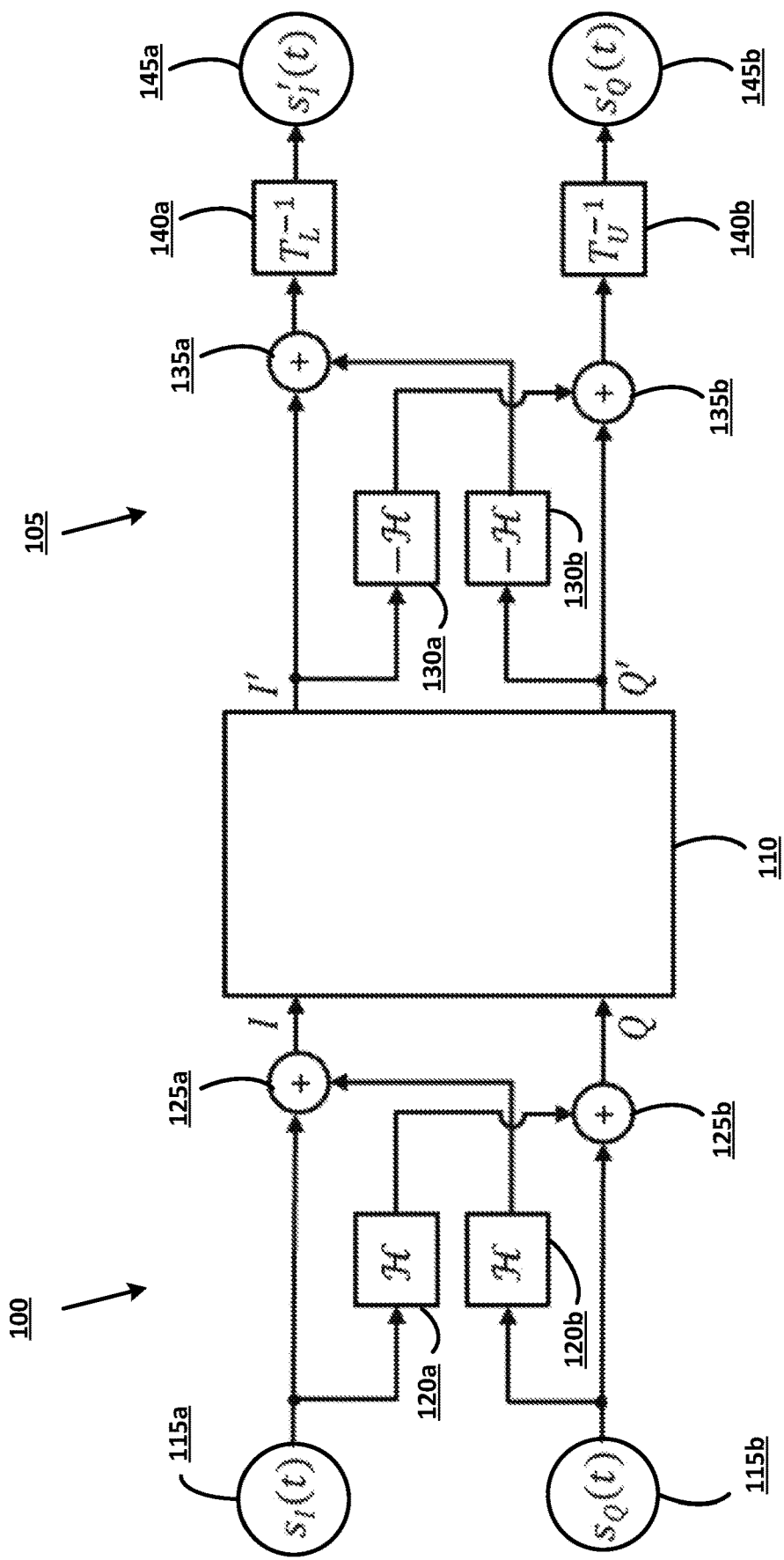
FIG. 1 depicts an example architecture with crosstalk mitigation, in accordance with various embodiments.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

As used herein, the term "module" may refer to, be part of, or include an application-specific integrated circuit (ASIC), an electronic circuit, a processor (shared, dedicated, or group) or memory (shared, dedicated, or group) that execute one or more software or firmware programs, a combinational logic circuit, or other suitable components that provide the described functionality.

Various operations may be described as multiple discrete operations in turn, in a manner that is most helpful in understanding the claimed subject matter. However, the order of description should not be construed as to imply that these operations are necessarily order dependent.

As noted, mmWave and THz waveguide interconnects may be desirable for use in datacenter and high-performance computing applications. Such uses may benefit from a waveguide signaling technology that increases achievable throughput while decreasing power consumption, i.e., that optimizes link power efficiency. It may also be desirable for such technology to have low latency or high density.

In general, waveguide dispersion may severely limit the achievable data rate and, thus, throughput. Specifically, for the approach of direct or superheterodyne up-conversion with dual-sideband (DSB) modulation, waveguide group dispersion over relatively long propagation lengths may limit the achievable data rate due to destructive interference of the sidebands upon demodulation. Some legacy systems may use purely dielectric waveguides, which may exhibit lower dispersion, but which may also have the disadvantages of radiation losses at bends and discontinuities, as well as crosstalk in bundles of waveguides.

Embodiments herein relate to transceiver baseband topologies that allow quadrature modulated signaling on dispersive waveguides at multiple carrier frequencies, i.e., simultaneous transmission of two baseband signals, such as data streams with pulse amplitude modulation (PAM), at each carrier frequency, while mitigating the detrimental, dispersion-induced crosstalk that may result with standard quadrature modulation and demodulation.

Generally, the signaling architectures described herein may mitigate the detrimental effects of waveguide dispersion. This may allow for increased data rate for individual carrier frequencies, and thereby increase the overall throughput at relatively low power consumption without a large number of oscillators and filters. Embodiments may also allow for flexibility and adaptability.

FIG. 1 depicts an example architecture with crosstalk mitigation, in accordance with various embodiments. Specifically, FIG. 1 shows the I→I' (or Q→Q') and Q→I' (or I→Q') lowpass (or baseband) transfer functions $T_{II,QQ,IQ,QI}(\omega)$, which may result from a mmWave waveguide interconnect system assembly that performs quadrature modulation and demodulation. As noted, embodiments herein may relate to mmWave waveguides, which may allow for propagation of electromagnetic signals with a frequency between approximately 30 gigahertz (GHz) and approximately 300 GHz. In other embodiments, the waveguide may be THz waveguides which may allow for propagation of electromagnetic signals with a frequency higher than approximately 300 GHz and on the order of up to 4 THz (or higher). As used herein, "I" may relate to an in-phase signal, and "Q" may relate to a quadrature signal. Additionally, $\omega$ may be equal to $2\pi f$, and may be the angular frequency that corresponds to the frequency f of the electromagnetic signal.

Specifically, FIG. 1 depicts a system that includes a transmit baseband module 100 and a receive baseband module 105 that are communicatively coupled by a radio frequency (RF) channel 110. It will be understood that FIG. 1 is a highly simplified depiction of the system, and real-world embodiments may have significantly more components than are depicted such as signal sources, various additional signal lines, buffers, etc. Generally, although the transmit baseband module 100 and receive baseband module 105 are discussed as being a unidirectional item, in other embodiments one or both of the transmit and receive baseband modules 100/105 may be replaced by a baseband module that has both transmit and receive functionalities. Generally, and as noted above, the transmit and receive baseband modules 100/105 may be, or may include, hardware, software, firmware, processors, logic, circuitry or one or more other components, either tangible or intangible, that may be configured to perform one or more of the processes, operations, or functions described herein.

Figure 6:
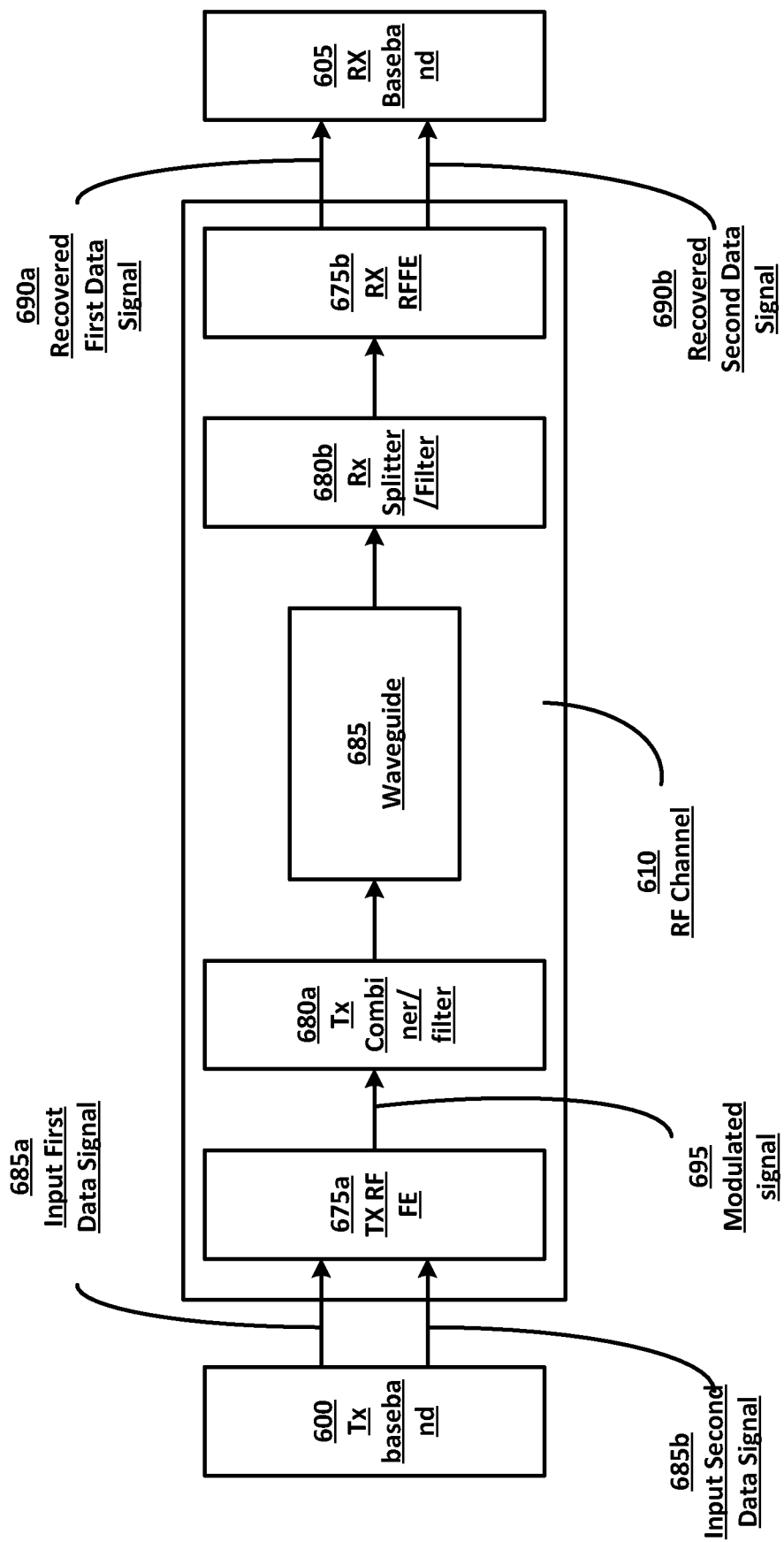
FIG. 6 depicts an example system-level view of an architecture which may include crosstalk mitigation, in accordance with various embodiments.

To provide context for the various items discussed or described herein, FIG. 6 depicts an example system-level view of an architecture which may include crosstalk mitigation, in accordance with various embodiments. Specifically, FIG. 6 depicts a transmit (TX) baseband module 600 which may be similar to, for example, transmit baseband module 100 or some other transmit baseband module discussed or described herein. The transmit baseband module 600 may provide a first data signal 685a and a second data signal 685b to an RF channel 610 which may be similar to, for example, RF channel 110 or some other RF channel described herein. Specifically, the transmit baseband module 600 may receive information related to the first or second data signals 685a and 685b from some other component of an electronic device to which the transmit baseband module 600 may be coupled. Such a component may be, for example, a processor, a processor core of a multi-core processor, a central processing unit (CPU), a graphics processing unit (GPU), or some other component, element, or logic of an electronic device.

The RF channel 610 may include a transmit RF front-end (RFFE) 675a, which may be configured to modulate the first and second data signals 685a and 685b to produce a modulated signal 695. The modulated signal may be modulated in accordance with quadrature amplitude modulation (QAM), quadrature phase shift keying (QPSK), pulse amplitude modulation (PAM) or some other modulation scheme. The RFFE 675a may be hardware, software, firmware, circuitry, logic, or some other component, element, or combination of elements which may be configured to perform the modulation function or other functions described herein.

The modulated signal may be output to a combiner/filter 680a. In some embodiments, the combiner/filter 680a may be coupled with a number of RFFEs such as RFFE 675a, and the combiner/filter 680a may be configured to receive a number of modulated signals such as modulated signal 695 and combine the signals in some manner. For example, the combiner/filter 680a may be or include hardware, software, firmware, or some other type of logic or circuitry to further modulate the signal(s), route the signal(s), buffer the signal(s), etc.

The combiner/filter 680a may output the modulated signal 695 (and other signals as appropriate) to waveguide 685, which may be, for example, a silicon waveguide, a metallic-clad dielectric waveguide, a dielectric-clad dielectric waveguide or some other type of waveguide. In some embodiments, the waveguide 685 may be on the order of 5 meters long, while in other embodiments the waveguide may be longer or shorter.

The modulated signal (and other signals output from the combiner/filter 680a) may propagate along the waveguide 685 to a corresponding receive (RX) splitter/filter 680b. Similarly to combiner/filter 680a, the splitter/filter 680b may be or include hardware, software, firmware, or some other type of logic or circuitry which may demodulate the signal received from the waveguide 685, route the signal to one or more receive RFFEs, buffer the signal, etc. Specifically, although only one receive RFFE 675b is depicted in FIG. 6, in other embodiments the receive splitter/filter 680b may be coupled with a number of RFFEs 675b, and may direct various signals to the various RFFEs 675b.

The receive RFFE 675b may be configured to demodulate the signal received from the splitter/filter 680b to produce a recovered first data signal 690a and a recovered second data signal 690b. Similarly to the RFFE 675a, the RFFE 675b may be or include hardware, software, firmware, circuitry, logic, or some other component, element, or combination of elements which may be configured to perform the demodulation function or other functions described herein. Generally, the first and second recovered data signals 690a and 690b may correspond to the first and second data signals 685a and 685b. The recovered first and second data signals 690a and 690b may be provided to a receive baseband module 605, which may be similar to, for example, receive baseband module 105 or some other receive baseband module described herein.

Generally, it will be understood that FIG. 6 depicts a transmit-side of the system, which may include baseband module 600, RFFE 675a and combiner/filter 680a. FIG. 6 further depicts a receive-side of the system, which may include splitter/filter 680b, RFFE 675b, and baseband module 605. Typically, the transmit-side of the system and the receive-side of the system may be implemented in different electronic devices which are communicatively coupled by waveguide 685. However, in other embodiments, the transmit-side of the system and the receive-side of the system may be implemented in a single physical device, for example a server rack, wherein different blades of the server rack are coupled by waveguide 685. Other implementations may be possible in other embodiments.

Returning to FIG. 1, the transmit baseband module 100 may include signal inputs 115a and 115b, which may receive a first and second data signal, respectively. The first data signal may be referred to as the "in-phase" signal, and may generally be indicated by the letter "I" in FIG. 1. For example, the first data signal may be received at the signal input 115a and propagate along a first signal path to be output at a signal output to the RF channel 110 at the location indicated by "I" in FIG. 1. The second data signal may be referred to as the "quadrature" signal, and may generally be indicated by the letter "Q" in FIG. 1. For example, the second data signal may be received at the signal input 115b and propagate along a second signal path to be output at a signal output to the RF channel 110 at the location indicated by "Q" in FIG. 1.

As may be seen, the transmit baseband module 100 may further include a first signal combiner 125a in the first signal path, and a second signal combiner 125b in the second signal path. The transmit baseband module 100 may further include a first finite impulse response (FIR) filter 120a in a communication path between the signal input 115a and the combiner 125b. The transmit baseband module 100 may further include a second FIR filter 120b in a communication path between the signal input 115b and the combiner 125a. The first and second FIR filters 120a/120b may be implemented as hardware, software, firmware, or some combination thereof, and may be configured to perform a Hilbert transform on a signal that propagates along the communication paths and through the FIR filters. Combiner 125a may then combine the output of FIR filter 120b with the first data signal, and combiner 125b may then combine the output of FIR filter 120a with the second data signal as shown in FIG. 1.

Generally, performing a Hilbert transform H of a signal may mathematically correspond to multiplication by the transfer function $T_H(\omega)=-j\text{sgn}(\omega)$ in the frequency domain, where j is the imaginary unit ($j^2=-1$). For example, H{cos($\omega t$)}=sin($\omega t$) for any frequency $\omega$ and all time t. As noted, this operation may be readily implementable as a FIR filter, and the FIR filter can be made causal by introducing a suitable delay. However, in other embodiments, the FIR filter may be replaced by a broadband 90-degree phase shifter, a Lange coupler, quadrature hybrid filters, branch-line hybrid filters, etc.

The signals may then be output from the transmit baseband module 100 to the RF channel 110, which may modulate the data signals, facilitate the conveyance of the data signals from the transmit baseband module 100 to the receive baseband module 105, demodulate the data signal, etc. as described above. Notably, the RF channel 110 may apply the transfer functions $T_{II,QQ,IQ,QI}(\omega)$ as described above. It will be understood that the various transfer functions may be such that $$\begin{bmatrix} T_{II}(\omega) & T_{IQ}(\omega) \\ T_{QI}(\omega) & T_{QQ}(\omega) \end{bmatrix} = \begin{bmatrix} T_{II}(\omega) & T_{IQ}(\omega) \\ -T_{IQ}(\omega) & T_{II}(\omega) \end{bmatrix}.$$

The receive baseband module 105 may include elements similar to those of the transmit baseband module 100. Specifically, the receive baseband module 105 may include a first signal path at which the first data signal may be recovered at an input (I') and provided to a signal output 145a. The receive baseband module 105 may also include a second signal path at which the second data signal may be recovered at an input (Q') and provided to a signal output 145b. The receive baseband module 105 may also include FIR filters 130a and 130b at which an inverse Hilbert transform may be performed, and then output to combiners 135a and 135b as shown.

Generally, the Hilbert transform arrangement shown in FIG. 1 may diagonalize the channel transfer matrix for all frequencies. This means that the first and second data signals (i.e., the I and Q channels) may be decoupled from one another, and I/Q crosstalk may be eliminated. It will be understood that with ideal building blocks, the transfer functions from 115a to the output of 135a and from 115b to the output of 135b may exhibit relatively flat, allpass behavior. In real-world embodiments, the elements of the baseband modules 100 and 105 or the RF channel 110 may not be ideal, but each of these transfer functions may still exhibit behavior that approaches allpass behavior.

It will be noted that the first data signal (e.g., the data signal received from signal input 115a) may be transmitted by the lower sideband associated with the carrier frequency, and the second data signal (e.g., the data signal received from signal input 115b) may be transmitted by the upper sideband associated with the carrier frequency. In other words, the system may exhibit single-sideband (SSB) quadrature modulation including quadrature phase shift keying (QPSK) and QAM, i.e., SSB-QPSK/QAM.

Additional dispersion compensation or equalization may be added at the transmit baseband module 100 or the receive baseband module 105. FIG. 1 depicts equalizers 140a and 140b at the receive baseband module 105. Typically, the equalizers 140a/140b may be configured to perform dispersion compensation or equalization at the receive-side of the system architecture, which may be based on inverting the transfer functions $T_L=T_{II}+T_{IQ}T_H$ form $T_L^{-1}$ and $T_U=T_{II}-T_{IQ}T_H$ to form $T_U^{-1}$. In some embodiments, the equalizers 140a and 140b may be implemented in causal circuits which may be adaptively changed to maximize signal integrity and power efficiency under varying conditions of the RF channel 110, for example, channel-loss.

In this manner, waveguide dispersion of the architecture in FIG. 1 may be mitigated, and overall throughput and spectral efficiency for a given carrier frequency may be maximized. Another advantage of the topology shown in FIG. 1 is that the Hilbert operations may be independent of the waveguide design (e.g., the design of a waveguide of RF channel 110 such as waveguide 685). This independence may be desirable in applications where waveguide cable assemblies of various lengths are employed.

Figure 2:
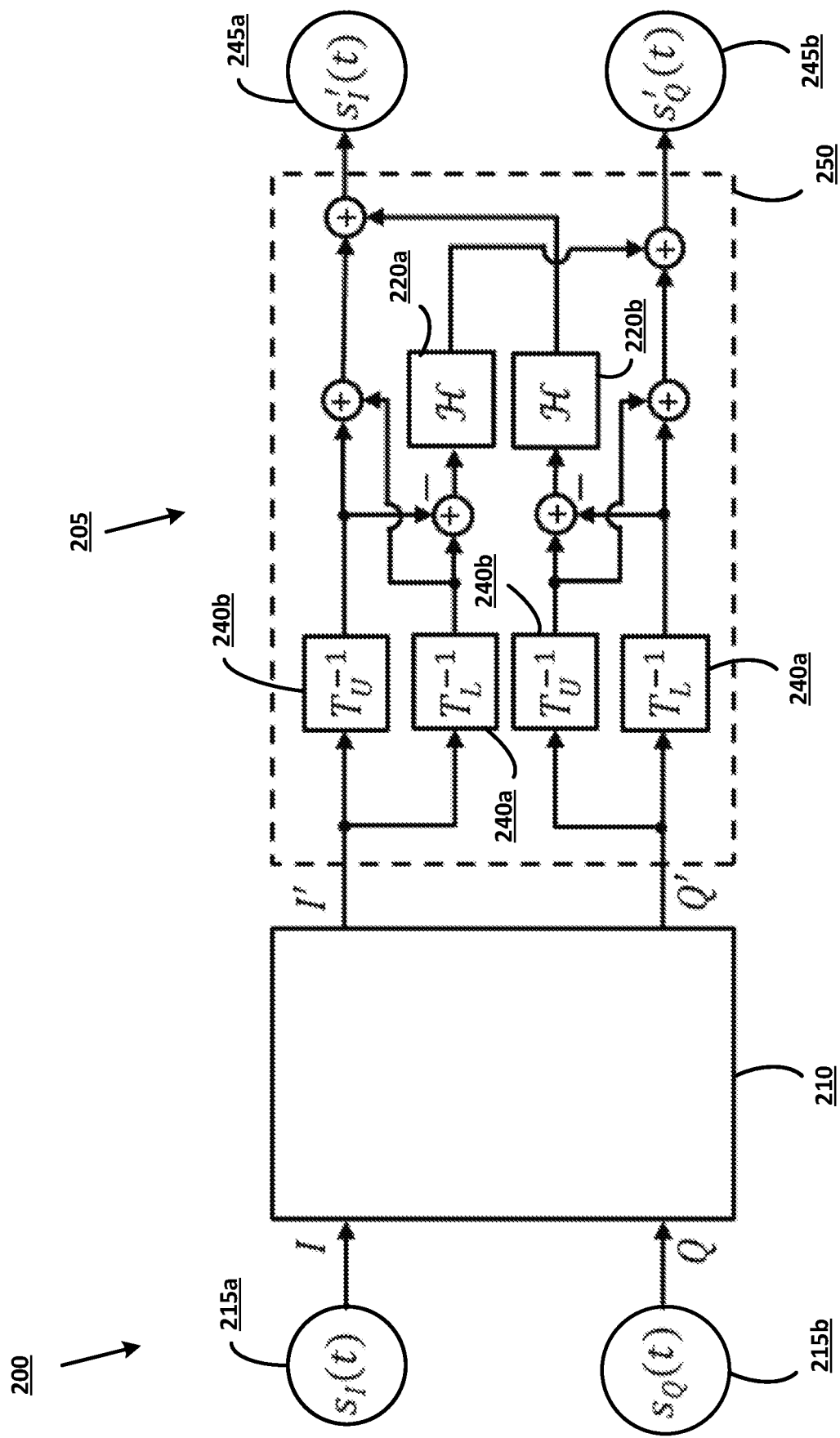
FIG. 2 depicts an alternative example architecture with crosstalk mitigation, in accordance with various embodiments.

FIG. 2 depicts an alternative example architecture with crosstalk mitigation, in accordance with various embodiments. Generally, FIG. 2 may be viewed as a mathematically similar to equivalent arrangement to the embodiment of FIG. 1. However, the baseband-related crosstalk mitigation may be implemented at the transmit-side or the receive-side, rather than at both the transmit-side and receive-side as depicted in FIG. 1. In FIG. 2, the crosstalk mitigation may be performed in the receive baseband module 205 rather than the transmit and receive baseband modules 200 and 205.

More generally, FIG. 2 depicts a transmit baseband module 200 which may be similar to baseband module 100. Specifically, the baseband module 200 may include signal inputs 215a and 215b, as well as signal outputs (indicated by I and Q) which may be respectively similar to the signal inputs 115a/115b and signal outputs of baseband module 100. FIG. 2 further depicts an RF channel 210 which may be similar to RF channel 110 of FIG. 1.

FIG. 2 may further depict a receive baseband module 205 which may be similar to receive baseband module 105. Specifically, the receive baseband module 205 may have signal inputs (indicated by "I'" and "Q'" in a manner similar to the signal inputs of baseband module 105) and signal outputs 245a and 245b (which may be similar to signal outputs 145a and 145b). The receive baseband module 205 may further include a number of combiners (which are not specifically enumerated for the sake of clarity and lack of clutter of the Figure, but may be considered to be similar to combiners 135a and 135b), FIR filters 220a and 220b which may be configured to perform a Hilbert transformation in a manner similar to FIR filters 120a and 120b, and equalizers 240a and 240b which may be similar to equalizers 140a and 140b.

In some cases, a FIR filter that is performing a Hilbert transform may exhibit conflicting low-frequency cutoff, which may cause distortion or intersymbol interference (ISI) at the receiver. The embodiment of FIG. 2 may resolve the low-frequency issue, and further provide the benefit of having two fewer FIR filters than are depicted in FIG. 1. Specifically, FIG. 2 may depict a crosstalk equalizer (CEQ) (which may also be referred to as a crosstalk cancellation device) which is formed of blocks that are all nearly allpass over a certain frequency range in situations where the waveguide of the RF channel 210 has a relatively flat transmission characteristic. It will be noted that the architecture depicted in FIG. 2 may be based on the assumption that the implementations of $T_L^{-1}$ and $T_U^{-1}$ are good approximations of the inverted transfer functions $T_L$ and $T_U$.

Figure 3:
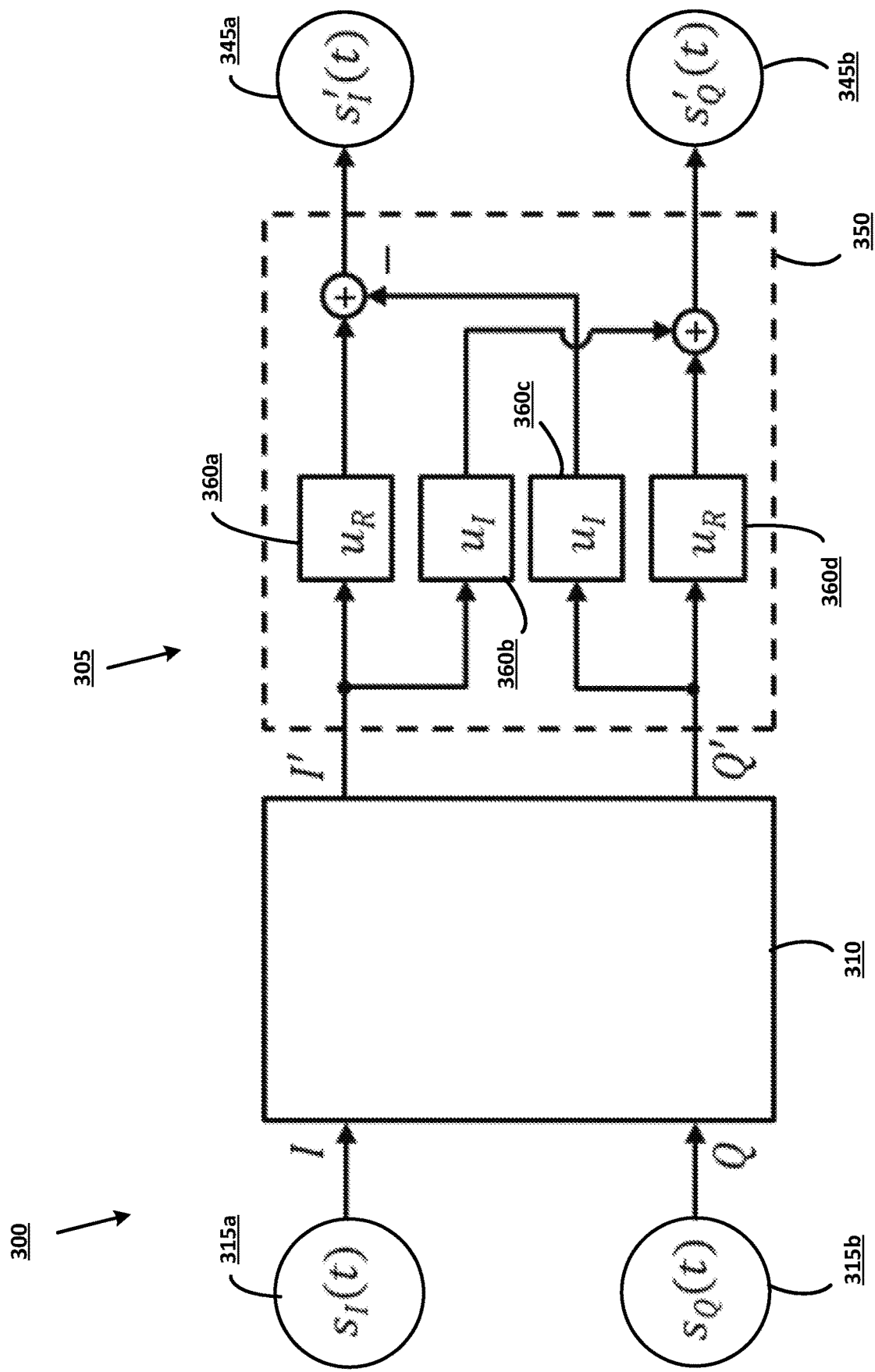
FIG. 3 depicts an alternative example architecture with crosstalk mitigation, in accordance with various embodiments.

FIG. 3 depicts an alternative example architecture with crosstalk mitigation, in accordance with various embodiments. Specifically, FIG. 3 depicts a transmit baseband module 300 which may be similar to baseband module 100.

The baseband module 300 may include signal inputs 315a and 315b, as well as signal outputs (indicated by I and Q) which may be respectively similar to the signal inputs 115a/115b and signal outputs of baseband module 100. FIG. 3 further depicts an RF channel 310 which may be similar to RF channel 110 of FIG. 1.

FIG. 3 may further depict a receive baseband module 305 which may be similar to receive baseband module 105. Specifically, the receive baseband module 305 may have signal inputs (indicated by "I" and "Q" in a manner similar to the signal inputs of baseband module 105) and signal outputs 345a and 345b (which may be similar to signal outputs 145a and 145b).

The receive baseband module may further include a CEQ 350 which may include a number of combiners (not specifically enumerated for the sake of lack of clutter of the Figure, but which will be recognizable as similar to combiners 125a/125b/135a/135b of FIG. 1). The CEQ 350 may further include a number of FIRs 360a/360b/360c/360d as depicted in FIG. 3.

Generally, in FIG. 3, the CEQ 350 may be realized by designing two pairs of real FIR filters $u_R$ 360a/360d and $u_I$ 360b/360c with unit interval (UI) sampling or less. For example, in some embodiments the FIR filters may have fractional UI sampling such as half-UI sampling or some other sampling interval less than or equal to the signaling UI. $u_R$ and $u_I$ may be the inverse Fourier transforms of $U_{II,\ QQ,\ IQ,\ QI}(\omega)$ which, in turn, may be the inverse of the matrix with elements $T_{II,\ QQ,\ IQ,\ QI}(\omega)$ and in accordance with $U_{II}=U_{QQ}=F\{u_R\}$ and $U_{QI}=-U_{IQ}=F\{u_I\}$ (where $F\{x\}$ indicates the Fourier transform of x).

It may be noted that the architecture of FIG. 3 may not depict an explicit Hilbert transform by FIR filters 360a-360d. Generalized zero-forcing utilizing complex-valued representations of the I and Q signals (i.e., the first and second data signals), and based on a least-mean-squared error approach may, instead, be used to determine tap coefficients of the FIR filters 360a-360d from the complex pulse response of the system. In some embodiments, it may be desirable or useful to make the tap coefficients programmable (and, thus, the CEQ 350 adaptive), in order to be able to optimize signal integrity dynamically. In some embodiments, such optimization may be based on input from a processor or other logic of the system (i.e., may be subject to system-level control). Purely analog or mixed-signal implementations may also be possible in other embodiments.

Figure 4:
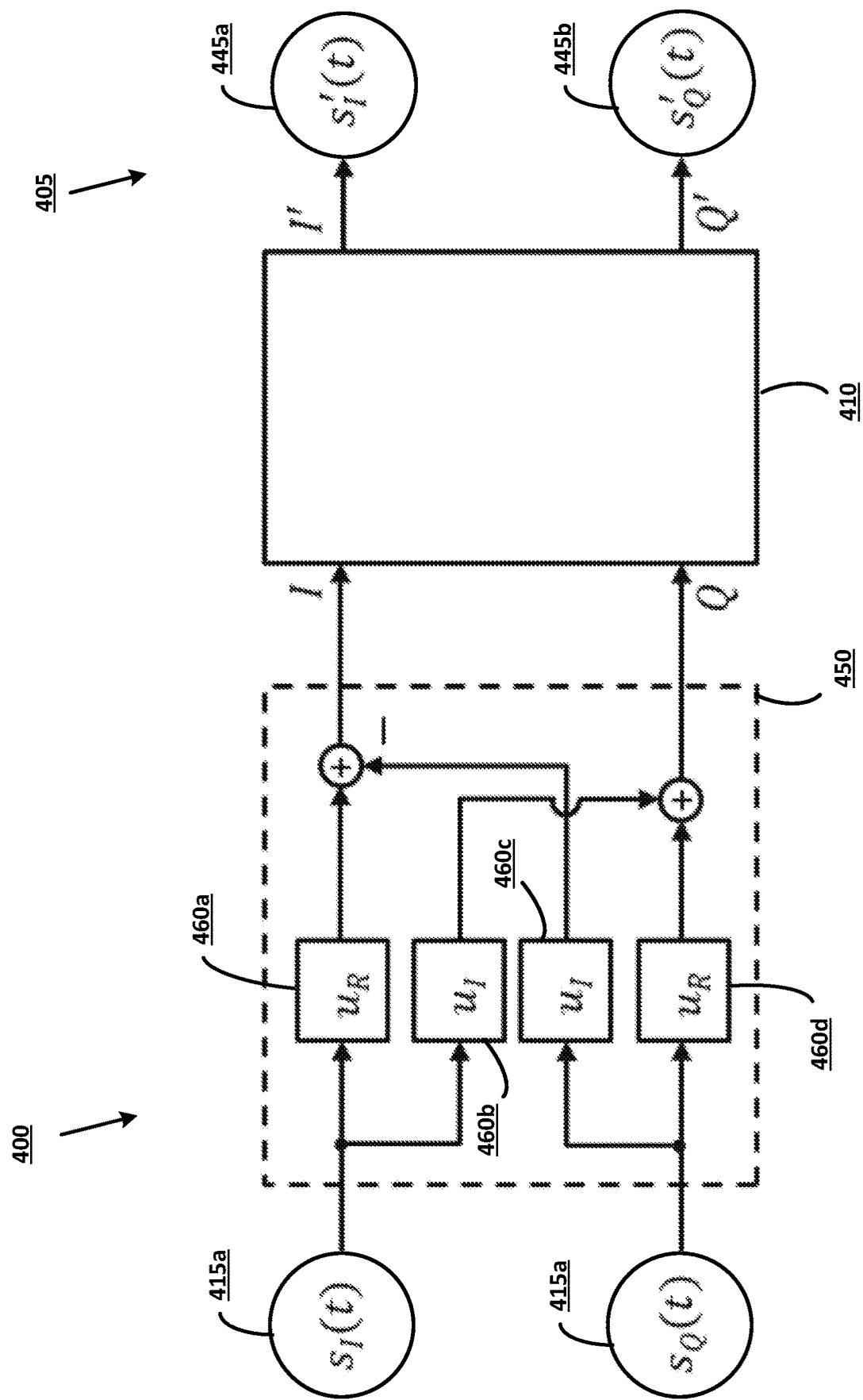
FIG. 4 depicts an alternative example architecture with crosstalk mitigation, in accordance with various embodiments.

For design flexibility, the embodiment of FIG. 4 may also be present. Specifically, the embodiment of FIG. 3 may include the CEQ 350 in the receive baseband module 305. However, because the CEQ may approximate the inverse of the channel transfer matrix, in other embodiments the CEQ may be present in the transmit baseband module as shown in FIG. 4.

More generally, FIG. 4 depicts an alternative example architecture with crosstalk mitigation, in accordance with various embodiments. Specifically, FIG. 4 depicts a receive baseband module 405 which may be similar to baseband module 105. The receive baseband module 405 may have signal inputs (indicated by "I" and "Q" in a manner similar to the signal inputs of baseband module 105) and signal outputs 445a and 445b (which may be similar to signal outputs 145a and 145b). The embodiment of FIG. 4 may further include an RF channel 410 which may be similar to RF channel 110 or some other RF channel of embodiments of the present disclosure.

FIG. 4 may further include a transmit baseband module 400, which may be generally similar to transmit baseband module 100. The baseband module 400 may include signal inputs 415a and 415b, as well as signal outputs (indicated by I and Q) which may be respectively similar to the signal inputs 115a/115b and signal outputs of baseband module 100. The baseband module 400 may further include a CEQ 450 which may be similar to CEQ 350. Specifically, the CEQ 450 may include a number of combiners (not specifically enumerated in FIG. 4) as well as FIR filters 460a, 460b, 460c, and 460d which may be similar to FIR filters 360a, 360b, 360c, and 360d.

Figure 5:
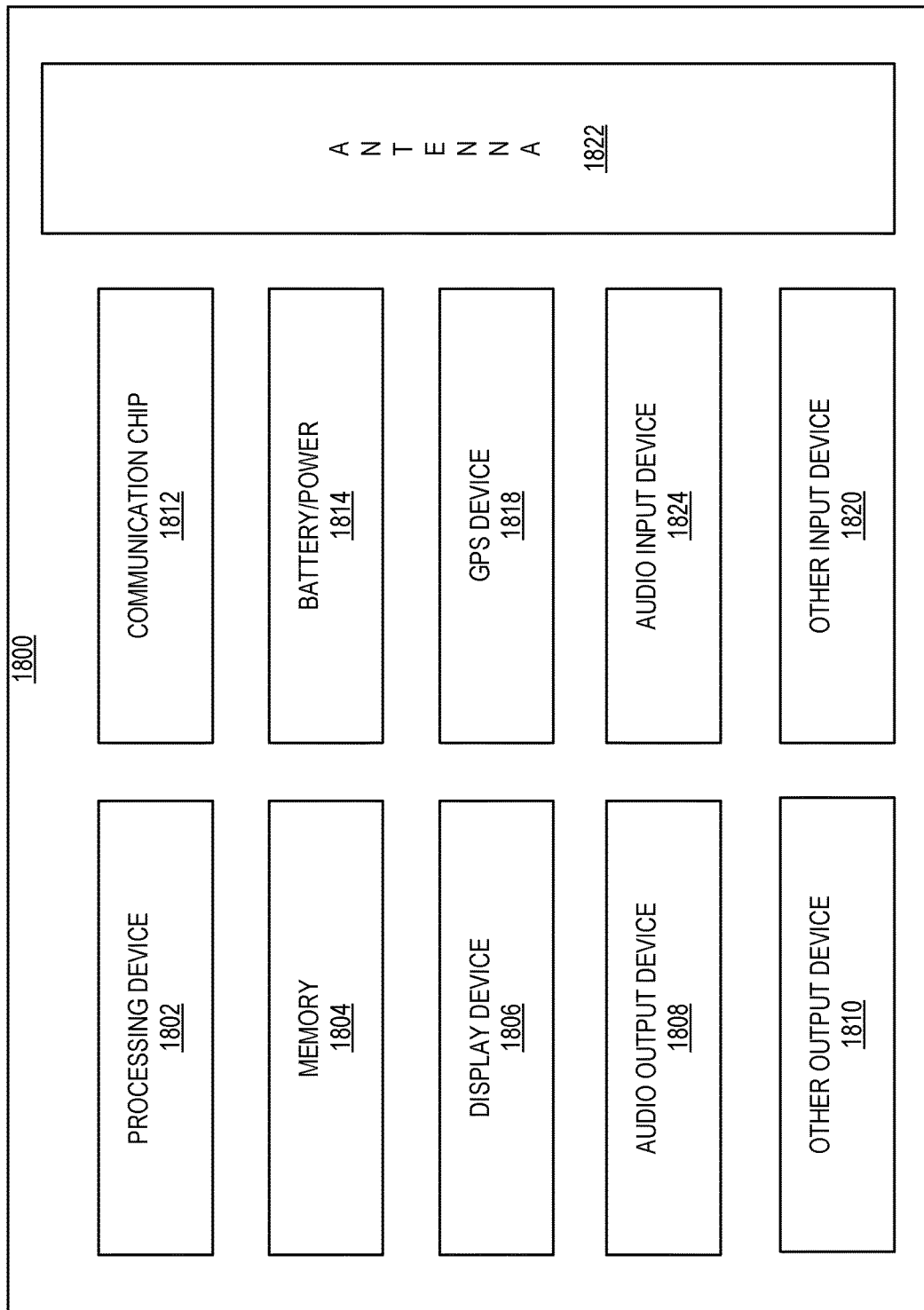
FIG. 5 is a block diagram of an example electrical device that may include a baseband module with crosstalk mitigation, in accordance with various embodiments.

In FIG. 5, the basis for moving the CEQ 450 into the transmit baseband module 400 may be that the CEQ may approximate the inverse of the channel transfer matrix, and so may be moved because of the commutability of the product of a non-singular square matrix $\overline{A}$ and its inverse, as indicated by $\overline{A}^{-1} \cdot \overline{A} = \overline{I} = \overline{A} \cdot \overline{A}^{-1}$ where $\overline{I}$ is the identity matrix. In various applications, the topologies of FIGS. 3 and 4 may be combined to place the CEQs at only one end of a bidirectional link, e.g., facilitating read or write operations.

Generally, it will be understood that quadrature modulated signaling over dispersive waveguide channels may not be limited to utilizing a single carrier frequency. Rather, embodiments described herein may be compatible with frequency division multiplexing (FDM) and may be combinable with other dispersion mitigation schemes or technologies. It will also be understood that embodiments herein are intended as example embodiments to illustrate various concepts and, as previously discussed, may not include various additional elements or components which may be present in real-world embodiments such as active components, passive components, interconnects, conductive elements, etc. Additionally, these embodiments are intended as sample embodiments and other variations may be present in other embodiments.

FIG. 5 is a block diagram of an example electrical device 1800 that may include one or more baseband module with crosstalk mitigation, in accordance with any of the embodiments disclosed herein. For example, any suitable ones of the components of the electrical device 1800 may include or be a baseband module such as baseband modules 100/104 or some other baseband module of embodiments of the present disclosure. A number of components are illustrated in FIG. 5 as included in the electrical device 1800, but any one or more of these components may be omitted or duplicated, as suitable for the application. In some embodiments, some or all of the components included in the electrical device 1800 may be attached to one or more motherboards. In some embodiments, some or all of these components are fabricated onto a single system-on-a-chip (SoC) die.

Additionally, in various embodiments, the electrical device 1800 may not include one or more of the components illustrated in FIG. 5, but the electrical device 1800 may include interface circuitry for coupling to the one or more components. For example, the electrical device 1800 may not include a display device 1806, but may include display device interface circuitry (e.g., a connector and driver circuitry) to which a display device 1806 may be coupled. In another set of examples, the electrical device 1800 may not include an audio input device 1824 or an audio output device 1808, but may include audio input or output device interface circuitry (e.g., connectors and supporting circuitry) to which an audio input device 1824 or audio output device 1808 may be coupled.

The electrical device 1800 may include a processing device 1802 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 1802 may include one or more digital signal processors (DSPs), ASICs, CPUs, GPUs, cryptoprocessors (specialized processors that execute cryptographic algorithms within hardware), server processors, or any other suitable processing devices. The electrical device 1800 may include a memory 1804, which may itself include one or more memory devices such as volatile memory (e.g., dynamic random-access memory (DRAM)), nonvolatile memory (e.g., read-only memory (ROM)), flash memory, solid state memory, and/or a hard drive. In some embodiments, the memory 1804 may include memory that shares a die with the processing device 1802. This memory may be used as cache memory and may include embedded dynamic random-access memory (eDRAM) or spin transfer torque magnetic random-access memory (STT-MRAM).

In some embodiments, the electrical device 1800 may include a communication chip 1812 (e.g., one or more communication chips). For example, the communication chip 1812 may be configured for managing wireless communications for the transfer of data to and from the electrical device 1800. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1812 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 1812 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 1812 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1812 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1812 may operate in accordance with other wireless protocols in other embodiments. The electrical device 1800 may include an antenna 1822 to facilitate wireless communications and/or to receive other wireless communications (such as AM or FM radio transmissions).

In some embodiments, the communication chip 1812 may manage wired communications, such as electrical, optical, or any other suitable communication protocols (e.g., the Ethernet). As noted above, the communication chip 1812 may include multiple communication chips. For instance, a first communication chip 1812 may be dedicated to shorter-range wireless communications such as Wi-Fi or Bluetooth, and a second communication chip 1812 may be dedicated to longer-range wireless communications such as global positioning system (GPS), EDGE, GPRS, CDMA, WiMAX, LTE, EV-DO, or others. In some embodiments, a first communication chip 1812 may be dedicated to wireless communications, and a second communication chip 1812 may be dedicated to wired communications. In some embodiments, the communication chip 1812 may be, may include, or may be communicatively coupled to a baseband module such as baseband modules 100/105 or some other baseband module related to embodiments of the present disclosure.

The electrical device 1800 may include battery/power circuitry 1814. The battery/power circuitry 1814 may include one or more energy storage devices (e.g., batteries or capacitors) and/or circuitry for coupling components of the electrical device 1800 to an energy source separate from the electrical device 1800 (e.g., AC line power).

The electrical device 1800 may include a display device 1806 (or corresponding interface circuitry, as discussed above). The display device 1806 may include any visual indicators, such as a heads-up display, a computer monitor, a projector, a touchscreen display, a liquid crystal display (LCD), a light-emitting diode display, or a flat panel display.

The electrical device 1800 may include an audio output device 1808 (or corresponding interface circuitry, as discussed above). The audio output device 1808 may include any device that generates an audible indicator, such as speakers, headsets, or earbuds.

The electrical device 1800 may include an audio input device 1824 (or corresponding interface circuitry, as discussed above). The audio input device 1824 may include any device that generates a signal representative of a sound, such as microphones, microphone arrays, or digital instruments (e.g., instruments having a musical instrument digital interface (MIDI) output).

The electrical device 1800 may include a GPS device 1818 (or corresponding interface circuitry, as discussed above). The GPS device 1818 may be in communication with a satellite-based system and may receive a location of the electrical device 1800, as known in the art.

The electrical device 1800 may include another output device 1810 (or corresponding interface circuitry, as discussed above). Examples of the other output device 1810 may include an audio codec, a video codec, a printer, a wired or wireless transmitter for providing information to other devices, or an additional storage device.

The electrical device 1800 may include another input device 1820 (or corresponding interface circuitry, as discussed above). Examples of the other input device 1820 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The electrical device 1800 may have any desired form factor, such as a handheld or mobile electrical device (e.g., a cell phone, a smart phone, a mobile internet device, a music player, a tablet computer, a laptop computer, a netbook computer, an ultrabook computer, a personal digital assistant (PDA), an ultra mobile personal computer, etc.), a desktop electrical device, a server device or other networked computing component, a printer, a scanner, a monitor, a set-top box, an entertainment control unit, a vehicle control unit, a digital camera, a digital video recorder, or a wearable electrical device. In some embodiments, the electrical device 1800 may be any other electronic device that processes data.

Examples of Various Embodiments

Example 1 includes a baseband module comprising: a first signal input to receive a first data signal; a second signal input to receive a second data signal; a first signal output to output the first data signal; a second signal output to output the second data signal; and a finite impulse response (FIR) filter in a communication path between the first signal input and the second signal output, wherein the FIR filter is to perform a Hilbert transform on the first data signal.

Example 2 includes the baseband module of example 1, further comprising a second FIR filter in a second communication path between the second signal input and the first signal output, wherein the second FIR filter is to perform a Hilbert transform on the second data signal.

Example 3 includes the baseband module of example 1, wherein: the first output is to output the first data signal to a radio frequency (RF) channel that is to perform quadrature modulation and demodulation; the second output is to output the second data signal to the RF channel; and the RF channel is to perform quadrature amplitude modulation (QAM) of the first and second data signals.

Example 4 includes the baseband module of example 3, wherein the RF channel is to perform QAM of the first and second data signals to produce a modulated data signal with a frequency of at least 30 gigahertz (GHz).

Example 5 includes the baseband module of any of examples 1-4, wherein: the first input is to receive the first data signal from a radio frequency (RF) channel; the second input is to receive the second data signal from the RF channel; and the RF channel is to perform quadrature amplitude demodulation of the first and second data signals prior to provision of the first and second data signals to the first and second inputs.

Example 6 includes the baseband module of example 5, further comprising an equalizer communicatively coupled between the first signal output and the communication path, wherein the equalizer is to perform equalization based on an inverse of a transfer function of the RF channel.

Example 7 includes a baseband module comprising: a first signal input to receive a first data signal; a second signal input to receive a second data signal; a first signal output to output the first data signal; a second signal output to output the second data signal; and a complex equalizer (CEQ) communicatively coupled to the first signal input, the second signal input, the first signal output, and the second signal output, wherein the CEQ includes: a first finite impulse response (FIR) filter in a communication path between the first signal input and the second signal output; and a second FIR filter in a communication path between the second signal input and the first signal output.

Example 8 includes the baseband module of example 7, wherein the first and second signal outputs are coupled with inputs of a radio frequency (RF) channel, and wherein the RF channel is to modulate the first and second data signals to produce a millimeter-wave (mmWave) or a terahertz (THz) signal.

Example 9 includes the baseband module of example 8, wherein the RF channel is to modulate the first and second data signals using quadrature amplitude modulation (QAM).

Example 10 includes the baseband module of example 7, wherein the first and second signal inputs are coupled with outputs of a radio frequency (RF) channel, and wherein the RF channel is to demodulate a millimeter-wave (mmWave) or a terahertz (THz) signal to produce the first and second data signals.

Example 11 includes the baseband module of any of examples 7-10, wherein the first FIR filter and the second FIR filter are to perform Hilbert transforms on signals that pass through the first and second FIR filters.

Example 12 includes the baseband module of example 11, wherein the CEQ further includes: first logic to perform a first inverse transform between the first signal input and the first signal output; second logic to perform a second inverse transform between the first signal input and the first FIR filter; third logic to perform a third inverse transform between the second signal input and the second FIR filter; and fourth logic to perform a fourth inverse transform between the second signal input and the second signal output.

Example 13 includes the baseband module of any of examples 7-10, wherein the first FIR filter and the second FIR filter have a sampling rate less than or equal to that of a signaling unit interval of the quadrature signal and the in-phase signal.

Example 14 includes the baseband module of example 13, wherein coefficients of the first FIR filter are programmable based on system-level control.

Example 15 includes the baseband module of example 14, wherein the coefficients are values of a programmable transistor or capacitor of the first FIR filter.

Example 16 includes the baseband module of any of examples 7-10, wherein the CEQ further includes: a third FIR communicatively coupled between the first signal input and the first signal output; and a fourth FIR communicatively coupled between the second signal input and the second signal output.

Example 17 includes an electronic device comprising: one or more processors; a radio frequency front-end (RFFE) to facilitate communication of a modulated electronic signal between the electronic device and another electronic device that is communicatively coupled with the electronic device by a waveguide; and a baseband module communicatively coupled with the processor and the RFFE, wherein the baseband module includes: a first signal path to facilitate communication of a first data signal between the one or more processors and the RFFE; a second signal path to facilitate communication of a second data signal between the one or more processors and the RFFE; a first finite impulse response (FIR) filter communicatively coupled between an input of the first signal path and an output of the second signal path; and a second FIR filter communicatively coupled between an input of the second signal path and an output of the first signal path.

Example 18 includes the electronic device of example 17, wherein the RFFE is to modulate the first and second data signals to produce a modulated data signal with a frequency greater than 30 gigahertz (GHz).

Example 19 includes the electronic device of example 18, wherein the RFFE is to modulate the first and second data signals to produce a modulated data signal with a frequency greater than 300 GHz.

Example 20 includes the electronic device of any of examples 17-19, wherein the first FIR filter is to perform a Hilbert transform on the first data signal.

Example 21 includes the electronic device of any of examples 17-19, wherein the first FIR filter is to perform equalization based on a system-programmable coefficient.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or limiting as to the precise forms disclosed. While specific implementations of, and examples for, various embodiments or concepts are described herein for illustrative purposes, various equivalent modifications may be possible, as those skilled in the relevant art will recognize. These modifications may be made in light of the above detailed description, the Abstract, the Figures, or the claims.

The invention claimed is:

1. A baseband module, comprising:
a first signal input to receive a first data signal;
a second signal input to receive a second data signal;
a first signal output;
a second signal output;
a first finite impulse response (FIR) filter in a communication path between the first signal input and the second signal output, wherein the first FIR filter is to perform a Hilbert transform on the first data signal to generate a first FIR filter output signal;
a second FIR filter in a communication path between the second signal input and the first signal output to generate a second FIR filter output signal based on the second data signal by performing the Hilbert transform on the second data signal; and
at least one of:
first logic to perform a first inverse transform between the first signal input and the first signal output;
second logic to perform a second inverse transform between the first signal input and the first FIR filter;
third logic to perform a third inverse transform between the second signal input and the second FIR filter; and
fourth logic to perform a fourth inverse transform between the second signal input and the second signal output.

2. The baseband module of claim 1, wherein the first and second signal inputs are coupled with outputs of a radio frequency (RF) channel, and wherein the RF channel is to demodulate a millimeter-wave or a terahertz signal to produce the first and second data signals.

3. The baseband module of claim 1, wherein the first FIR filter and the second FIR filter have a sampling rate less than or equal to that of a signaling unit interval of the first data signal and the second data signal.

4. The baseband module of claim 1, further comprising:
a third FIR filter communicatively coupled between the first signal input and the first signal output; and
a fourth FIR filter communicatively coupled between the second signal input and the second signal output.

5. An electronic device, comprising:
one or more processors;
a radio frequency (RF) component to facilitate communication of a modulated signal between the electronic device and another electronic device to be communicatively coupled with the electronic device by a waveguide; and
a baseband module communicatively coupled with the one or more processors and the RF component, wherein the baseband module includes:
a first signal path to facilitate communication of a first data signal between the one or more processors and the RF component;
a second signal path to facilitate communication of a second data signal between the one or more processors and the RF component;
a first finite impulse response (FIR) filter communicatively coupled between an input of the first signal path and an output of the second signal path, wherein the first FIR filter is to perform a Hilbert transform on the first data signal; and
a second FIR filter communicatively coupled between an input of the second signal path and an output of the first signal path.

6. The electronic device of claim 5, wherein the RF component is to modulate one or more data signals output by the baseband module to produce a modulated data signal with a frequency greater than 30 gigahertz.

7. The electronic device of claim 5, wherein the RF component is to modulate one or more data signals output by the baseband module to produce a modulated data signal with a frequency greater than 300 gigahertz.

8. The electronic device of claim 5, wherein the first FIR filter is further to perform equalization based on a coefficient.

9. The baseband module of claim 1, wherein the first signal output is to output a first output signal, the second signal output is to output a second output signal, the first and second signal outputs are coupled with inputs of a radio frequency (RF) channel, and the RF channel is to modulate the first output signal and the second output signal to produce a millimeter-wave or a terahertz signal.

10. The baseband module of claim 9, wherein the RF channel is to modulate the first output signal and the second output signal using quadrature amplitude modulation (QAM).

11. The baseband module of claim 9, wherein the first output signal is based on the second FIR filter output signal, and the second output signal is based on the first FIR filter output signal.

12. The baseband module of claim 1, wherein the first signal output is to output a first output signal, the second signal output is to output a second output signal, the first output signal is based on the second FIR filter output signal, and the second output signal is based on the first FIR filter output signal.

13. The electronic device of claim 8, wherein the coefficient is a programmable coefficient.

14. A baseband module, comprising:
a first signal input to receive a first data signal;
a second signal input to receive a second data signal;
a first signal output to output the first data signal;
a second signal output to output the second data signal; and a complex equalizer (CEQ) communicatively coupled to the first signal input, the second signal input, the first signal output, and the second signal output, wherein the CEQ includes:
- a first finite impulse response (FIR) filter in a communication path between the first signal input and the second signal output, and
- a second FIR filter in a communication path between the second signal input and the first signal output,
wherein the first FIR filter and the second FIR filter are to perform Hilbert transforms on signals that pass through the first and second FIR filters.

15. The baseband module of claim 14, wherein the first and second signal outputs are coupled with inputs of a radio frequency (RF) channel, and wherein the RF channel is to modulate the first and second data signals to produce a millimeter-wave or a terahertz signal.

16. The baseband module of claim 15, wherein the RF channel is to modulate the first and second data signals using quadrature amplitude modulation.

17. The baseband module of claim 14, wherein the first and second signal inputs are coupled with outputs of a radio frequency (RF) channel, and wherein the RF channel is to demodulate a millimeter-wave or a terahertz signal to produce the first and second data signals.

18. The baseband module of claim 14, wherein the CEQ further includes:
- first logic to perform a first inverse transform between the first signal input and the first signal output;
- second logic to perform a second inverse transform between the first signal input and the first FIR filter;
- third logic to perform a third inverse transform between the second signal input and the second FIR filter; and
- fourth logic to perform a fourth inverse transform between the second signal input and the second signal output.

19. The baseband module of claim 14, wherein the first FIR filter and the second FIR filter have a sampling rate less than or equal to that of a signaling unit interval of quadrature signals and in-phase signals.

20. The baseband module of claim 14, wherein coefficients of the first FIR filter are programmable.

21. The baseband module of claim 14, wherein the CEQ further includes:
- a third FIR communicatively coupled between the first signal input and the first signal output; and
- a fourth FIR communicatively coupled between the second signal input and the second signal output.

* * * * *